United States Patent

Keskinen et al.

[11] Patent Number: 4,726,900
[45] Date of Patent: Feb. 23, 1988

[54] STACKED SHEET FILTER ELEMENT

[75] Inventors: Alan Keskinen, Van Nuys, Calif.; John Pearson, Walpole, Mass.

[73] Assignee: Vacco Industries, El Monte, Calif.

[21] Appl. No.: 890,322

[22] Filed: Jul. 29, 1986

[51] Int. Cl.$^4$ ............................................. B01D 29/46
[52] U.S. Cl. .................................. 210/488; 210/498; 55/278; 55/485
[58] Field of Search ............... 210/232, 322, 488, 489, 210/498, 314, 483; 55/485, 486, 483, 278

[56] References Cited

U.S. PATENT DOCUMENTS

| | | | |
|---|---|---|---|
| 1,555,574 | 5/1925 | Herrmann | 210/488 |
| 2,447,797 | 8/1948 | Cox | 210/488 |
| 2,826,309 | 3/1958 | Forman et al. | 210/488 |
| 3,037,633 | 6/1962 | Vietel et al. | 210/232 |
| 3,079,001 | 10/1962 | May | 210/492 |
| 3,195,730 | 7/1965 | Muller | 210/488 |
| 3,214,368 | 10/1965 | Muller | 210/799 |
| 3,481,480 | 12/1969 | Schwinghammer | 210/488 |
| 3,700,111 | 10/1972 | Bode | 210/488 |
| 3,784,015 | 1/1974 | Kasten | 210/322 |
| 3,827,568 | 8/1974 | Toth et al. | 210/488 |
| 4,132,649 | 1/1979 | Croopnick et al. | 210/347 |
| 4,267,045 | 5/1981 | Hoof | 210/322 |
| 4,272,257 | 6/1981 | Ellion et al. | 55/38 |
| 4,410,430 | 10/1983 | Hagler, Jr. | 210/446 |

Primary Examiner—Richard V. Fisher
Assistant Examiner—Wanda L. Millard
Attorney, Agent, or Firm—Frederick E. Mueller

[57] ABSTRACT

A thin and narrow sheet, having an inlet edge and an outlet edge, is formed on one surface, e.g., the top, with a continuous land that is parallel to the inlet edge. The inlet side of the land is coplanar with the inlet edge of the sheet or, alternatively, disposed slightly inwardly relative thereto. Inwardly behind the land the same surface of the sheet is formed with a plurality of channels defined between adjacent pairs of finger lands each of which extends between the outlet edge of the sheet and the inside of the continuous land. On its opposite side the sheet is formed with a like plurality of transverse lands that form fluid passages extending across the full width of the sheet from the inlet to the outlet edges thereof. The bottom surface lands register with the finger lands of the top surface of the sheet. A congruent stack of the sheets is compressively loaded through the lands to define a rigid filter column. Each pair of adjacent sheets to the stack is so oriented relative to one another that the continuous land of the top surface of one sheet abuts the full width transverse lands on the bottom of the adjacent sheet such that the filter pores or openings are defined by the intersections of the continuous land and the fluid passages on the under side of a disc.

7 Claims, 16 Drawing Figures

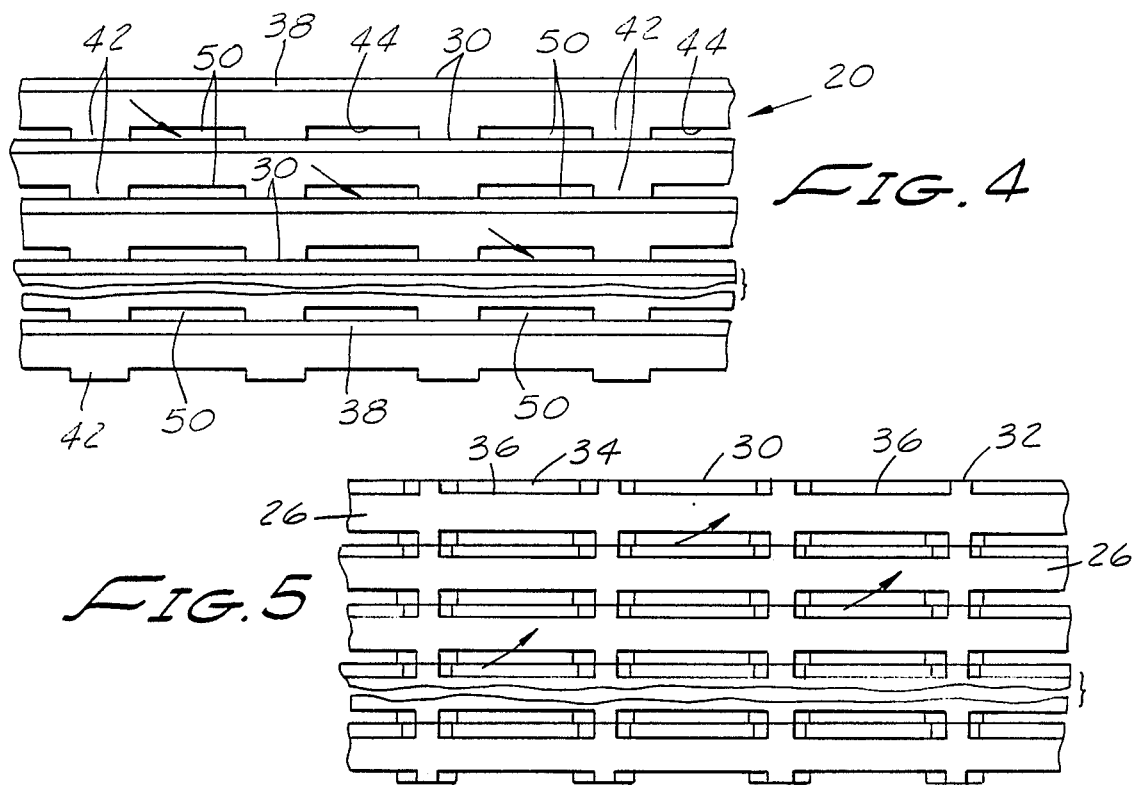
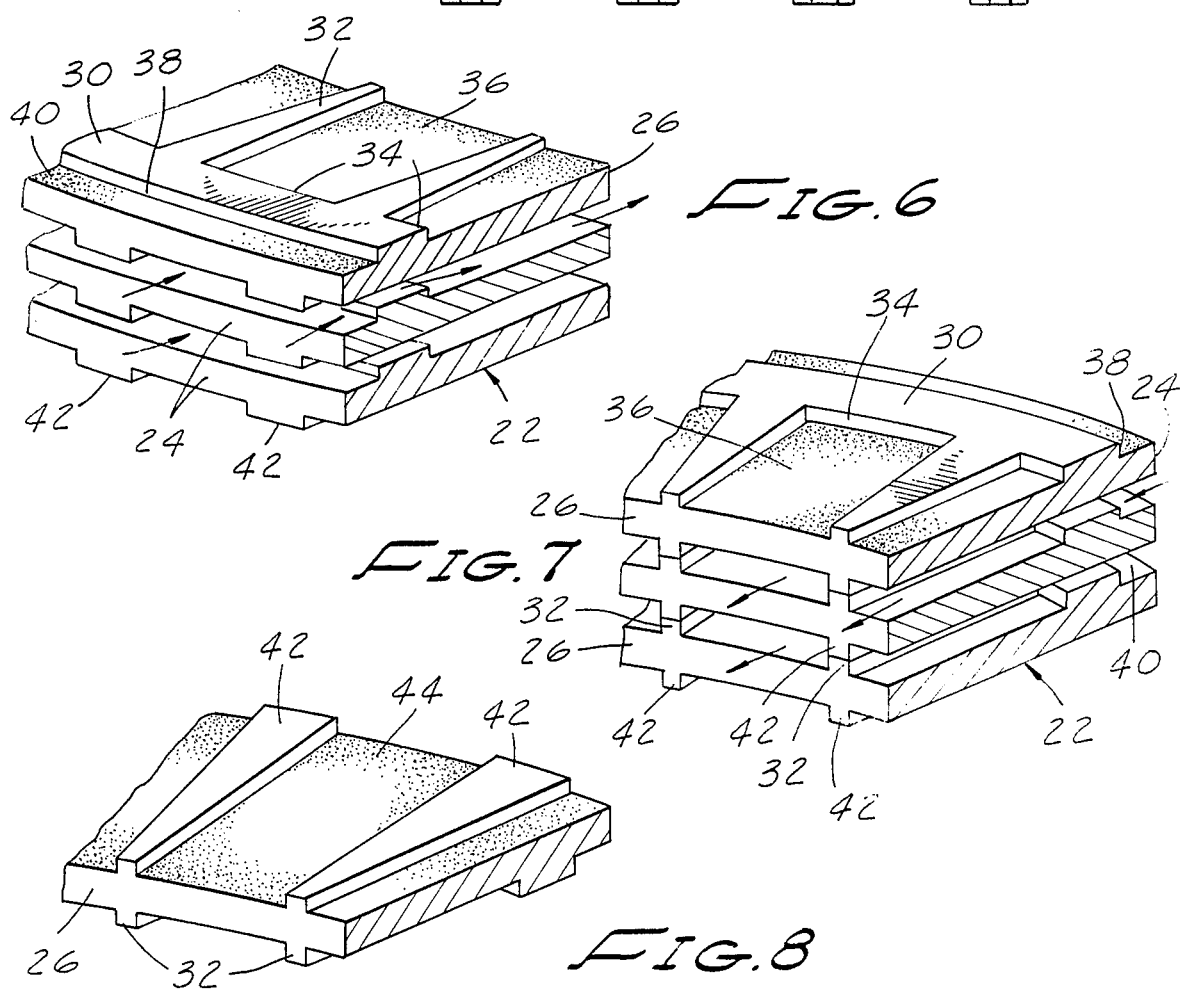

STACKED SHEET FILTER ELEMENT

BACKGROUND OF THE INVENTION

The present invention relates to filters and, more particularly, to edge type filters comprised of a stack of filter discs or elements.

In order to remove solid particles from a flowing gas or liquid wire mesh or sintered filters have sometimes heretofore been used, particularly for the separation of particles smaller than 100 microns. Such filters may have certain advantages when compared to an edge type filter comprised of a stack of filter discs, washers or other sheet elements. In a wire mesh screen, for example, each flow passage through the screen is very short thus minimizing pressure drop through the filter. Additionally, wire mesh screen may be advantageous in maximizing the ratio of open or pore area relative to the solid area of the filter mesh and thus provide a greater filter capacity per unit weight of the structure. However, wire mesh and sintered filters also inherently have certain disadvantages. For example, it is virtually impossible to attain a uniform size of opening of the pores or interstices of a wire mesh or sintered filter; the filters have an inherently low resistance to high pressure differentials; and the filter elements cannot be satisfactorily back-flushed for cleaning and re-use.

Stacked sheet filters, such as that disclosed in Pearson U.S. Pat. No. 3,648,843, overcome many of the disadvantages of wire mesh and sintered filters. However, as compared to wire mesh and sintered filters, stacked sheet filters typically have relatively long flow passages therethrough and, accordingly, induce a relatively high pressure drop. Further, stacked sheet filters have a relatively low ratio of open space to closed space as compared to wire mesh and sintered filters.

SUMMARY OF THE INVENTION

An object of the present invention is to provide an improved stacked sheet edge-type filter having the advantages of a wire mesh or sintered filter in that it incorporates very short flow passages therethrough to minimize pressure drop and in that it can have a relatively high ratio of open area to closed area. To that end the filter of the present invention comprises a compressively loaded stack of identical thin, narrow sheet elements each of which is etched on both sides in a prescribed pattern such that each adjacent pair of sheets defines a great multiplicity of short flow channels from the inlet to the outlet side of the filter stack.

More particularly, the filter element of the invention comprises a thin and narrow band of a sheet material, e.g. stainless steel. On one side, which for convenience of description but not in a limiting sense will be referred to as the top side, the sheet is etched out to define an unbroken land that is continuously parallel to the inlet edge of the filter element, as well as a spaced series of channel defining finger lands each of which extends between the outlet edge of the sheet and the inside or downstream side of the continuous land. The upstream side of the continuous land is coplanar with or, alternatively, spaced slightly downstream from the upstream edge of the filter element. On its opposite side, for convenience of reference referred to as the bottom side, the sheet is etched out to leave a like plurality of transverse lands that form fluid flow passages extending across the full width of the narrow band sheet from the inlet to the outlet edges thereof. The finger lands of the top surface of the sheet are oriented or aligned in registration with the transverse lands on the bottom surface of the sheet so that when a plurality of the filter elements are compressively stacked together these land areas provide the structural bearing surfaces for the column loaded stack of discs or elements.

The filter of the invention comprises a stack of the filter elements arranged congruently such that the passage-defining transverse lands on the bottom surface of an element are seated on top of and in registration with the finger lands of the top surface of the sheet below. Accordingly, each pore of the filter is defined by the cross-sectional area of the intersection of the continuous land on the top surface of one element and the fluid passage channel defined on the underside of the adjacent element.

BRIEF DESCRIPTION OF THE DRAWINGS

FIG. 4 is a fragmentary elevational view of the inlet side of the disc stack of the invention taken in the direction of the line 4—4 of FIG. 1.

FIG. 5 is a partial elevational view from the interior of the stack of FIG. 1, taken in the direction of the line 5—5 of FIG. 1.

FIG. 6 is a fragmentary perspective view of a section of the stack of FIG. 1, viewed from the exterior of the stack.

FIG. 7 is a fragmentary perspective view of the stack of FIG. 1, viewed from the interior of the stack of elements.

FIG. 8 is a fragmentary perspective view of the bottom surface of one of the filter elements.

DESCRIPTION OF THE PREFERRED EMBODIMENTS

Figure 1:
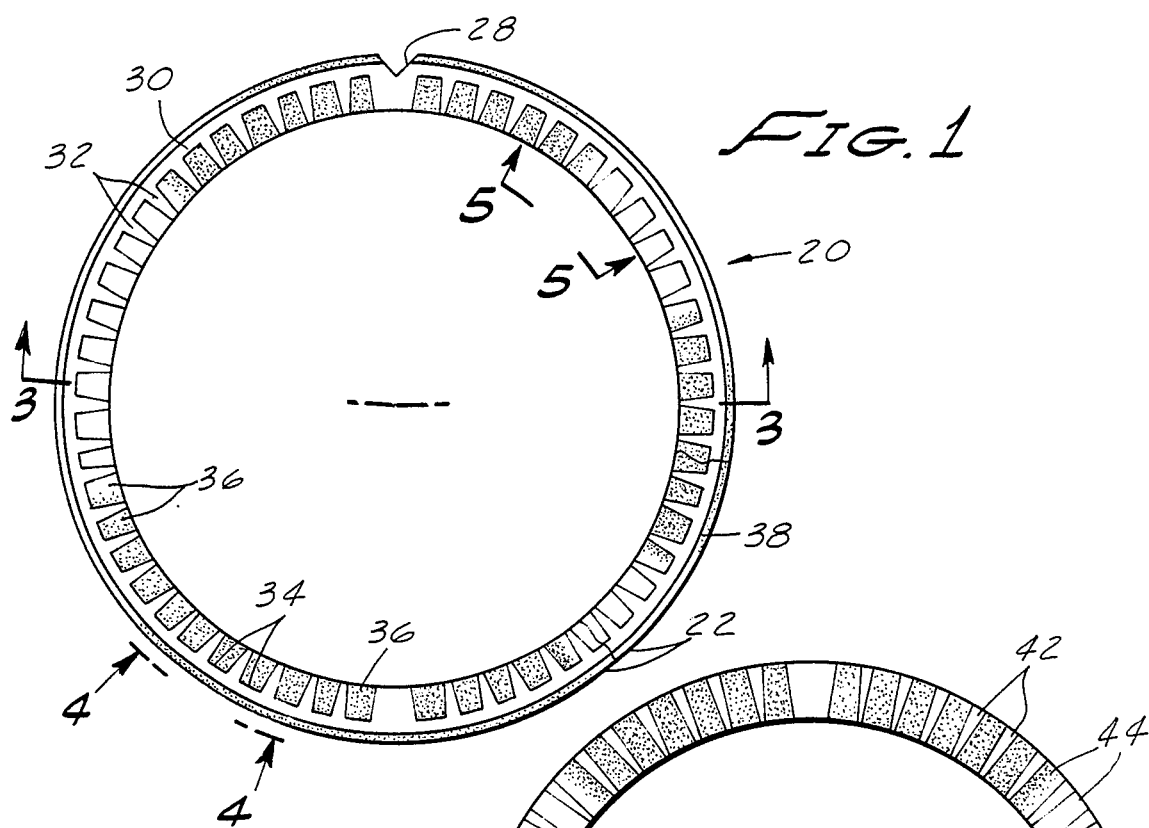
FIG. 1 is a top plan view of a filter element stack of the present invention.

Before explaining the invention in detail, it is to be understood that the invention is not limited in its application to the precise details of construction and the arrangements of the components set forth in the following description or illustrated in the drawings. The invention is capable of other embodiments and of being practiced and carried out in various ways. Also, it should be understood that the phraseology and terminology employed herein is for the purposes of description and should not be regarded as limiting.

The filter elements of the invention may be made of any material which is appropriate for the intended use, manufactured by techniques appropriate to that material, and given any desired regular or irregular configuration. For example, the filter elements could be molded of an appropriate plastic material into either an annular or sinuous or rectangular shape of sheet. In the case of the illustrated embodiments of the invention, the filter elements may be made of very thin sheets of stainless steel material and are produced by etching annular discs out of the metal sheet and etching out the opposite sides of the sheet to leave a desired pattern of lands on both sides of the sheet in a manner which is well understood in the art.

More particularly, in connection with the embodiment of the invention shown in FIGS. 1-8, the filter of the invention comprises a stack 20 of identical annular filter elements 22 that have been etched out of a thin sheet of a stainless steel material, e.g., 0.010 to 0.002 inches in thickness. Typically, although not necessarily, in the case of an annular filter element it is intended that the flow of fluid across the element be in a radially inward direction. Accordingly, in the illustrated case the outer circumferential edge 24 of the element 22 is the inlet edge while the inner circumferential edge 26 of the element is the oulet edge. The radial width of the element 22 is selected to be a minimum consistent with structural integrity in a highly porous, thin walled filter stack with a minimum length of pore passages. At some point on its outer periphery each filter element 22 is formed with an alignment notch 28 whereby all of the elements of a given filter stack can be accurately and congruently stacked so that the etched patterns on the opposite faces of the filter will be maintained in precise registration with one another.

On its upper face, as shown in FIG. 1, each filter element 22 is partially etched out in the pattern indicated by the shaded areas of the figure. More particularly, the top face (so referred to for convenience of description) is etched out so as to leave standing in relief, relative to the imperforate base of material, an upstanding continuous or unbroken land 30 and a uniformly spaced apart series of finger lands 32 extending radially inwardly from a downstream side 34 of the continuous land 30. Each adjacent pair of finger lands 32 thus defines a channel 36 that is isolated, by the width of the continuous land 30, from an upstream side 38 of the continuous land. It should be noted in the embodiment of FIGS. 1-8 that the upstream side 38 of the continuous land is spaced radially inwardly from the inlet edge 24 of the filter element by the width of an annular ledge or continuous shoulder 40. The shoulder 40 and passages 36 are preferably etched to the same depth and to a depth appropriate for the size of filter element under consideration. For example, assuming that what is desired is a filter with a 5 micron rating, of a diameter of about 6 inches or less, a disc thickness in the range of 0.010 to 0.002 inches thickness, and a radial width of continuous land 30 of 0.030 inches or less, the depth of etch of the annular shoulder 40 and passages 36 may be in the range of approximately 15 to 25 microns. In the same case, the radial width of the annular shoulder is preferably approximately 0.010 to 0.012 inches.

Figure 2:
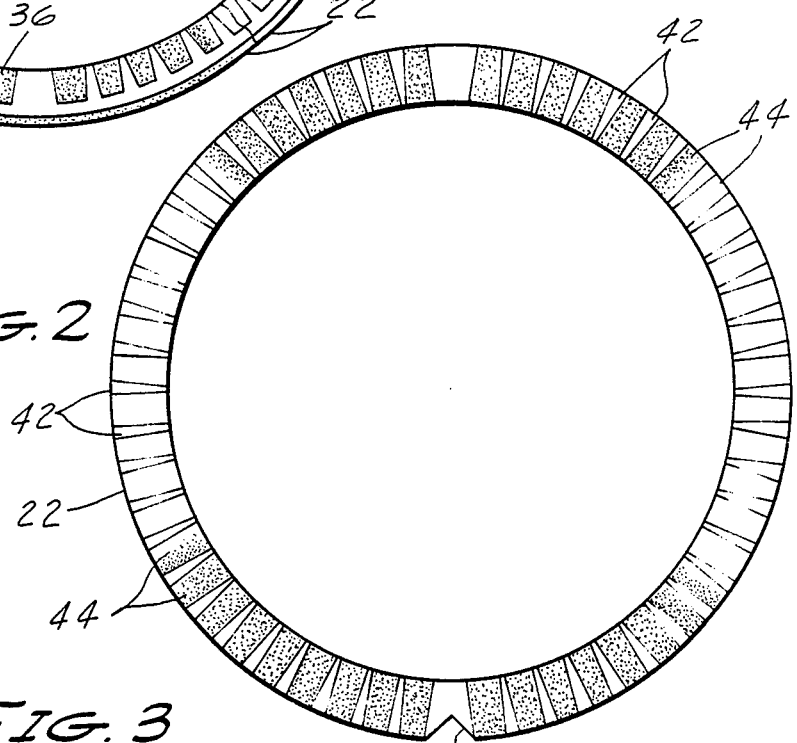
FIG. 2 is a plan view of the opposite side of a disc of FIG. 1.

The etch pattern for the under side of a filter element 22 is shown in FIG. 2 and comprises a uniformly spaced apart series of transverse or radial lands 42 spanning the full radial width of the filter element band, between adjacent pair of which are defined etched out filter flow passages 44. Making the same assumption that a filter with a 5 micron rating is desired, the filter flow passages 44 are etched out to a depth of 5 microns.

The number of finger lands 32 on top of the filter 22 is the same as the number of transverse lands 42 on the under side of the element, the arrangement being such that each finger land 32 is in alignment with an opposite side land 42. Further, except for the greater length of the transverse lands 42, the overlapping parts of lands 32 and 42 are congruent. Thus, in the illustrated embodiment the opposite sides of a land 32 and of a land 42 taper radially inwardly, at about a 5 degree included angle thus defining, respectively, divergent channels 36 and 44.

As shown in FIGS. 3-7, in order to make a filter a plurality of the identical elements 22 are congruently stacked one on top of the other and compressively loaded by an appropriate supporting structure in a manner well understood in the art, e.g., U.S. Pat. No. 3,648,843. Thus, in each adjacent pair of elements 22 the continuous land 30 on the top of one element contacts the transverse lands 42 formed on the underside of the adjacent element. As is indicated in the right-hand part of FIG. 3, the column loading of the stack of filter elements is absorbed through the areas of contacting intersection of the continuous land 30 and the radial lands 42 as well as through the superimposed contact areas of the lands 42 and the finger lands 32.

The stack 20 of filter elements defines a multiplicity of filter openings or pores 50, each of which is defined by the crossing of a portion of the continuous land 30 over a fluid flow passage 44. In the illustrated case, the filter pores 50 are of horizontally elongate rectangular configuration. However, it will be appreciated by those skilled in the art that the rating of the filter is determined by the depth of the fluid flow passage 44. Thus, if the underside of a filter element is etched to a depth of 5 microns in the filter flow passage 44, that will be its nominal rating irrespective of the horizontal length of the pore 50. As shown in FIG. 4, the horizontal length of each pore 50 is about twice that of a transverse land 42 between adjacent channels 44. Thus, in each horizontal plane of the filter assembly having the pores 50 it is possible to achieve a relatively high ratio of open area to solid area of the structure. Alternatively, where it is desired to maximize the number of pores 50 in each horizontal plane of the assembly, the ratio can be reduced, e.g., to a 50/50 ratio.

Figure 3:
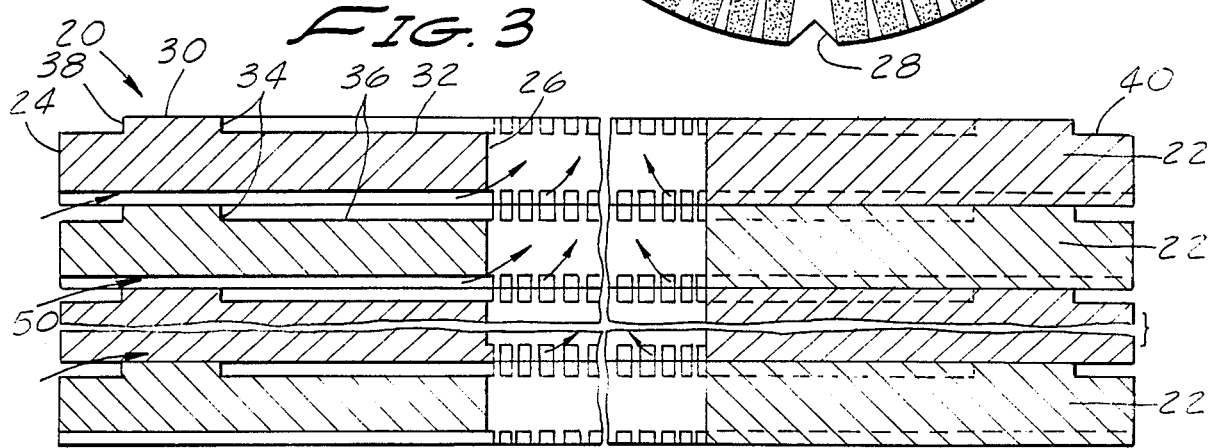
FIG. 3 is a cross-section of a stack of the discs of FIG. 1, taken on the line 3—3, and on a larger scale.
Figure 9:
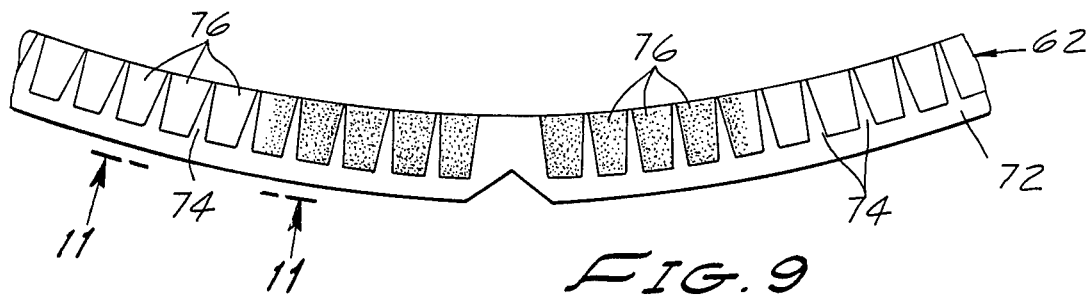
FIG. 9 is a top plan view of an arcuate fragment of an alternative embodiment of the filter element of the invention.
Figure 10:
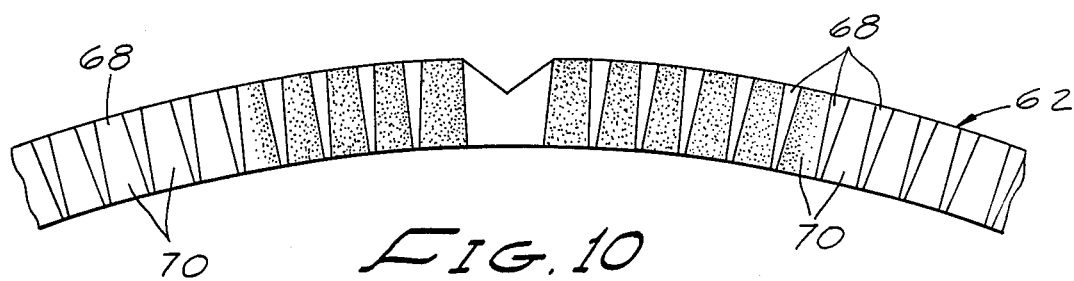
FIG. 10 is a bottom plan view of the fragment of element shown in FIG. 9.
Figure 11:
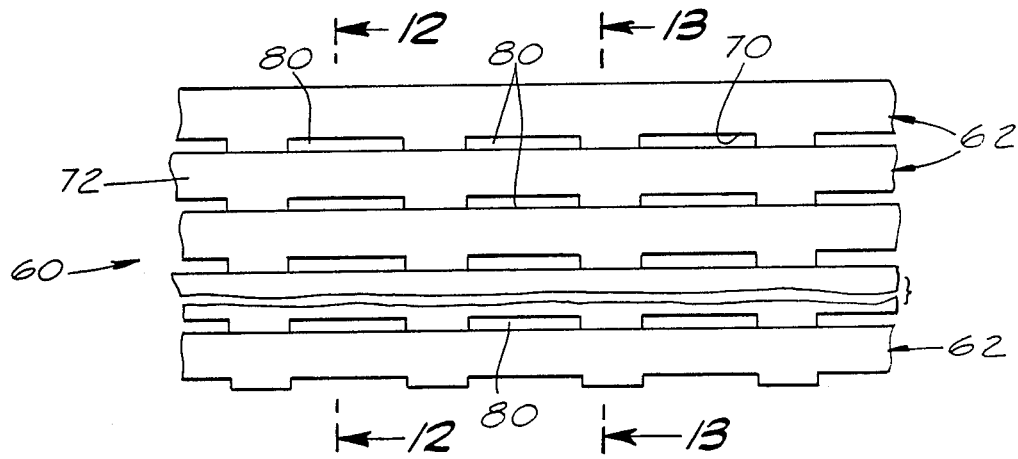
FIG. 11 is a side elevational view of a stack of the elements of FIG. 9, taken in the direction of the line 11—11 of FIG. 9.
Figure 12:
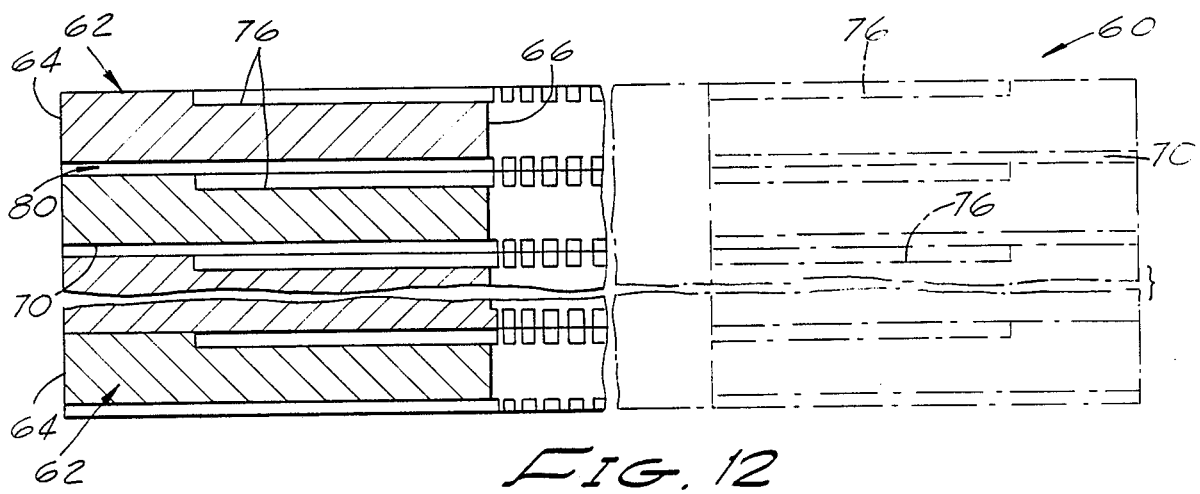
FIG. 12 is a sectional view of a stack of the elements of FIG. 9, taken on the line 12—12 of FIG. 11.
Figure 13:
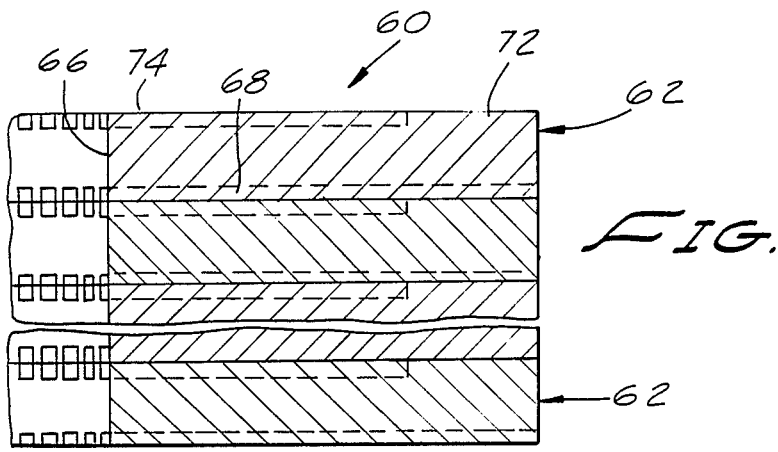
FIG. 13 is a sectional view taken on the line 13—13 of FIG. 11.
Figure 14:
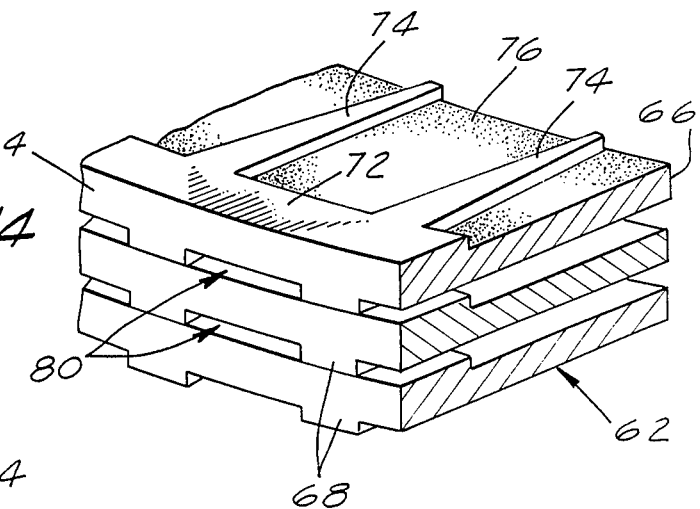
FIG. 14 is a fragmentary perspective view of a stack of the elements of FIG. 9, as viewed from the exterior of the stack.
Figure 15:
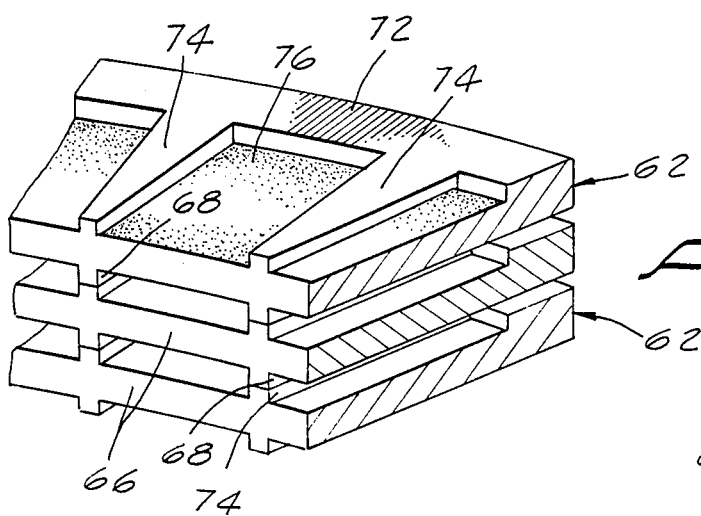
FIG. 15 is a fragmentary perspective view of a portion of a stack of the elements of FIG. 9, as viewed from the outlet side of the stack.
Figure 16:
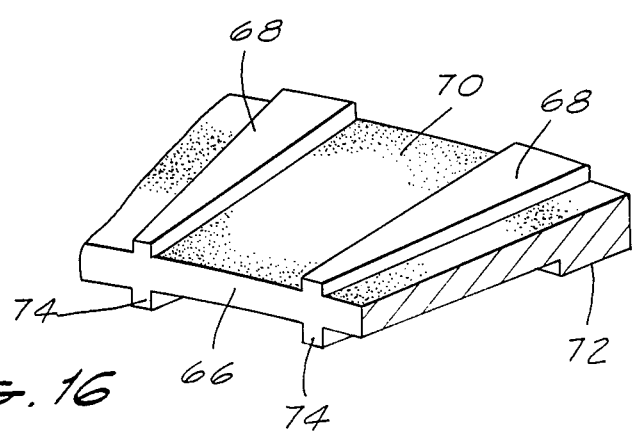
FIG. 16 is a fragmentary perspective view of the underside of a portion of one of the elements of FIG. 9.

As is best seen on the left side of FIG. 3, the inlet opening to each filter pore 50 is off-set downstream inwardly from the outer edges 24 of the discs 22 by the width of the ledge or shoulder 40. Accordingly, particles which are too large to pass through the pore 50 can settle out on the ledge 40 and accumulate thereon. Ultimately, a continuous coating of such particles accumulates not only in a continuous circumferential band coextensive with the ledge 40 but, also, within the ends of the flow passages 44 upstream of the upstream side 38 of the land 30. Accordingly, a stack of the filter elements 22 can accumulate and hold a larger amount of separated out particles than would be the case if the entrances to the pores 50 were immediately contiguous to or coincident with the inlet edges 24 of the filter elements. This accumulation of filtered out particles (sometimes called a "pre-coat") acts as a pre-filtering stage in advance of the entrance to the pores 50. In other words, the interstices between the particles separated out by a filter pore 50, being smaller than the depth of the pore 50, filter out particles even smaller than the filter pore size and thus aids in preventing plugging of the filter pore 50 itself.

Immediately downstream of each filter pore 50 the fluid flow channel area increases to the combined depths of the channel 36 and that area of the passage 44 in confronting relationship thereto. Also, as the passages 36 and 44 may be of inwardly divergent configuration between the lands 32 and 42, the cross-sectional flow area increases radially inwardly. Thus, such particles as do pass through a pore 50 will more readily pass through the remainder of the downstream passage without being trapped between adjacent filter elements 22. This downstream expansion of the flow passage, particularly in combination with the short length of the flow passage of the pore 50, is particularly advantageous during backflushing operations to clean the filter since the internal trapping of particles has been minimized.

An alternative embodiment of the invention is shown in FIGS. 9-16, comprising a stack 60 of identical filter elements 62. As before, the filter element may take the form of a narrow annular band that has been etched out of a thin sheet of a stainless steel material and has an inlet edge 64 and an outlet edge 66. The underside of each element is etched in a pattern similar to that of the first embodiment, comprising an equally spaced series of tapered transverse or radial lands 68 standing out in relief from etched out fluid flow passages 70. The pattern of the top side of a filter element 62 differs from that of the first embodiment in that it comprises a continuous land 72 whose upstream side is a co-planar flush extension of the inlet edge 64 of the filter element, rather than being spaced inwardly. The top face of the alternative embodiment is otherwise similar to the first embodiment and has an equally spaced series of finger lands 74 standing out in relief from etched out channels 76 that extend from the downstream side of continuous land 72 to outlet edge 66 of the element. As before, the lands 68 and 74 are in superimposed alignment with one another.

A congruent stack of the filter elements 62 produces a multiplicity of filter openings or pores 80, each of which is defined by the continuous land 72 crossing over a flow passage 70. However, as best seen on the left side of Fig. 12, the inlet end of the pores 80 is co-planar with the inlet edges 66 of the filter stack. Accordingly, as the filter elements 62 do not have the annular ledge 40 of the first embodiment a stack of the filter elements 62 will not accumulate and maintain as much of a pre-coat of filtered out particles as can the first embodiment. However, as before, each filter pore 80 is very short in length, comprising merely the radial width of continuous land 72, and downstream of the continuous land immediately communicates with an enlarged area comprising a combined depth of the passages 70, 76 so as to minimize accumulation of particles between adjacent filter discs.

We claim:

1. A one piece filter element for an edge type filter comprising:
   a sheet of material having an inlet edge and an outlet edge and an opposite pair of parallel surfaces, each of said surfaces having portions removed to define integral lands standing out in relief from opposite sides of an imperforate base portion;
   said lands of one of said surfaces comprising (1) an unbroken land that is continuously parallel to said inlet edge and (2) a spaced series of finger lands that are integral with said unbroken land and extend from a downstream side of said unbroken land to said outlet edge,
   each adjacent pair of finger lands defining a channel therebetween over one side of said imperforate base portion;
   said lands of the other of said surfaces comprising a spaced apart series of transverse lands, each of which extends from said inlet edge to said outlet edge,
   each adjacent pair of transverse lands defining a fluid flow passage therebetween over the other side of said imperforate base portion, and
   each of said finger lands on said one surface of said sheet being aligned with and in superimposed relation to one of said transverse lands on said other surface of said sheet.

2. A filter element as in claim 1 in which:
   said unbroken land has an upstream side that is spaced downstream from said inlet edge of said sheet.

3. A filter element as in claim 1 in which:
   said unbroken land has an upstream side that is co-planar with said inlet edge of said sheet.

4. A filter element as in claim 1 in which:
   said sheet is an annular band.

5. A filter element as in claim 1 in which:
   said sheet is a rectangular band.

6. A filter element as in claim 1 in which:
   each of said finger lands and each of said transverse lands tapers convergently towards said outlet edge of said sheet.

7. An edge type filter comprising a stack of congruently arranged filter elements according to claims 1, 2, 3, 4, 5 or 6, each adjacent pair of filter elements being arranged such that said one surface of one of the pair of elements abuts said other surface of the other of said pair of elements.

* * * * *